(12) United States Patent
Ciccone

(10) Patent No.: US 12,151,414 B2
(45) Date of Patent: Nov. 26, 2024

(54) INJECTION MOLDING SYSTEM WITH DYNAMIC NOZZLE SEAL

(71) Applicant: INJECTNOTECH INC., Mississauga (CA)

(72) Inventor: Vince Ciccone, Kleinburg (CA)

(73) Assignee: Injectnotech Inc., Mississauga (CA)

( * ) Notice: Subject to any disclaimer, the term of this patent is extended or adjusted under 35 U.S.C. 154(b) by 652 days.

(21) Appl. No.: 17/382,762

(22) Filed: Jul. 22, 2021

(65) Prior Publication Data
US 2023/0023482 A1    Jan. 26, 2023

(51) Int. Cl.
*B29C 45/27* (2006.01)
*B29C 45/22* (2006.01)

(52) U.S. Cl.
CPC .......... *B29C 45/2725* (2013.01); *B29C 45/22* (2013.01); *B29C 45/2701* (2013.01); *B29C 2045/2729* (2013.01); *B29C 2045/2733* (2013.01); *B29C 2045/2761* (2013.01); *B29C 2045/2762* (2013.01)

(58) Field of Classification Search
None
See application file for complete search history.

(56) References Cited

U.S. PATENT DOCUMENTS

| | | | |
|---|---|---|---|
| 5,896,640 | A | 4/1999 | Azinski et al. |
| 6,062,846 | A | 5/2000 | Kalemba |
| 6,860,732 | B2 | 3/2005 | Babin et al. |
| 2012/0251657 | A1 | 10/2012 | Adas et al. |
| 2013/0056562 | A1 | 3/2013 | Overfield et al. |
| 2014/0183790 | A1 | 7/2014 | Ciccone |

FOREIGN PATENT DOCUMENTS

CA    2837637 A1    6/2014

*Primary Examiner* — Armand Melendez
(74) *Attorney, Agent, or Firm* — Smart & Biggar LP

(57) ABSTRACT

An injection molding nozzle system for delivering molten material from a manifold to a nozzle is disclosed. The manifold and nozzle are disposed within pocket of a manifold plate. The nozzle is secured to a melt-transfer bushing disposed within the manifold via a collar. The collar is secured to the bushing such that it is centered about the axis of the outlet of the bushing. A support ring supports the nozzle within the pocket such that the nozzle is centered about the axis of the pocket. In a cold state, the outlet of the bushing and the inlet of the nozzle are misaligned. In operation, thermal expansion of the components bring the outlet of the bushing and the nozzle into alignment. The melt-transfer bushing and the connection of the nozzle to the manifold, via the releasable connection between the collar and the bushing facilitates manufacture and assembly of the system.

20 Claims, 10 Drawing Sheets

INJECTION MOLDING SYSTEM WITH DYNAMIC NOZZLE SEAL

FIELD

The present invention relates to nozzles for hot runner systems of plastic injection molds and, in particular, to such nozzles equipped with dynamic seals.

BACKGROUND

Multi-cavity molds use manifolds to transfer molten plastic from a central feeding point that is connected to a molten material conduit device, or sprue bar, of an injection machine, to a plurality of injection points leading to the respective molding cavities. A common problem of hot runner systems is the difficulty to control the thermal expansion of the manifold while maintaining effective sealing between nozzles and the manifold. Typical challenges encountered in hot runner systems may relate to: excessive thermal expansion of the components, which may cause failure due to pressures, component fatigue, and wear; insufficient thermal expansion, which may cause uneven or minimal contact between mold components, resulting in molten material or plastic leaks; or, in the case of nozzles that are directly screwed into the manifold, excessive lateral expansion of the manifold, causing lateral deflection of the nozzles.

A number of prior designs rely on the axial thermal expansion of components to create effective sealing between the components of the mold system that is required to prevent plastic leakage between the nozzle(s) and the manifold. While these designs address some of the issues encountered in systems that make use of a physical connection between the nozzles and the manifold (e.g. nozzles that are directly screwed into the manifold), systems that rely on the axial thermal expansion of components to establish the required seals require that the system reach full operating temperature before the seal is established. Thus, if the injection process is started before the system reaches the optimal operating temperature, or if a nozzle heater burns out, thereby preventing the nozzle or system from reaching the optimal temperature, the system is prone to plastic leakage, as the "cold gaps" that are designed into the system are not fully closed. Accordingly, systems that allow for lateral thermal expansion of the manifold, while eliminating lateral deflection of the nozzles, and that also provide improved axial sealing between the nozzles and the manifold, without relying solely on the thermal expansion of the components to achieve such sealing are desirable. Additionally, systems that allow for lateral thermal expansion of the manifold and that provide for improved axial sealing, without relying solely on the thermal expansion of the components to establish an effective seal, that are easier and/or less costly to manufacture are also desirable.

SUMMARY OF INVENTION

In accordance with one aspect of the invention there is provided an injection molding nozzle system comprising a manifold; a melt-transfer bushing disposed within the manifold, the melt-transfer bushing defining a melt-transfer passage having an inlet end configured for receiving molten material from the manifold along a melt-receiving axis and an outlet end configured for discharging molten material along a melt discharge axis, the outlet end defining a melt discharge opening that defines an outlet center along the melt discharge axis when viewed in an axial direction; a nozzle having an inlet end for receiving molten material from the melt-transfer bushing and a discharge end for discharging the received molten material, a molten material passage extending along a nozzle passage axis and interconnecting the inlet end and the discharge end, the inlet end of the nozzle defining a nozzle center along the nozzle passage axis when viewed in the axial direction; and a collar configured for receiving the nozzle and for releasably coupling to the melt-transfer bushing; wherein the melt-transfer bushing has an outwardly extending flange configured for engaging the manifold; the collar has an outwardly extending flange configured for engaging the manifold, a central opening through which the nozzle extends, and an inwardly extending flange configured for engaging the inlet end of the nozzle; and the releasable coupling of the collar to the melt-transfer bushing is with effect that the inlet end of the nozzle is disposed in abutting contact with the outlet end of the melt-transfer bushing such that the inlet end of the nozzle is disposed in fluid communication with the melt-transfer passage; the outwardly extending flange of the melt-transfer bushing applies a first sealing force against a first side of the manifold in a first direction such that a first sealed interface is effected between the melt-transfer bushing and the first side of the manifold; the outwardly extending flange of the collar applies a second sealing force against a second, opposite side of the manifold in a second direction such that a second sealed interface is effected between the collar and the second side of the manifold, wherein the second direction is opposite to the first direction; and relative movement between the nozzle and the melt-transfer bushing in response to thermal expansion of the manifold is permitted.

For a further understanding of the nature and advantages of the invention, reference should be made to the following description taken in conjunction with the accompanying drawings.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
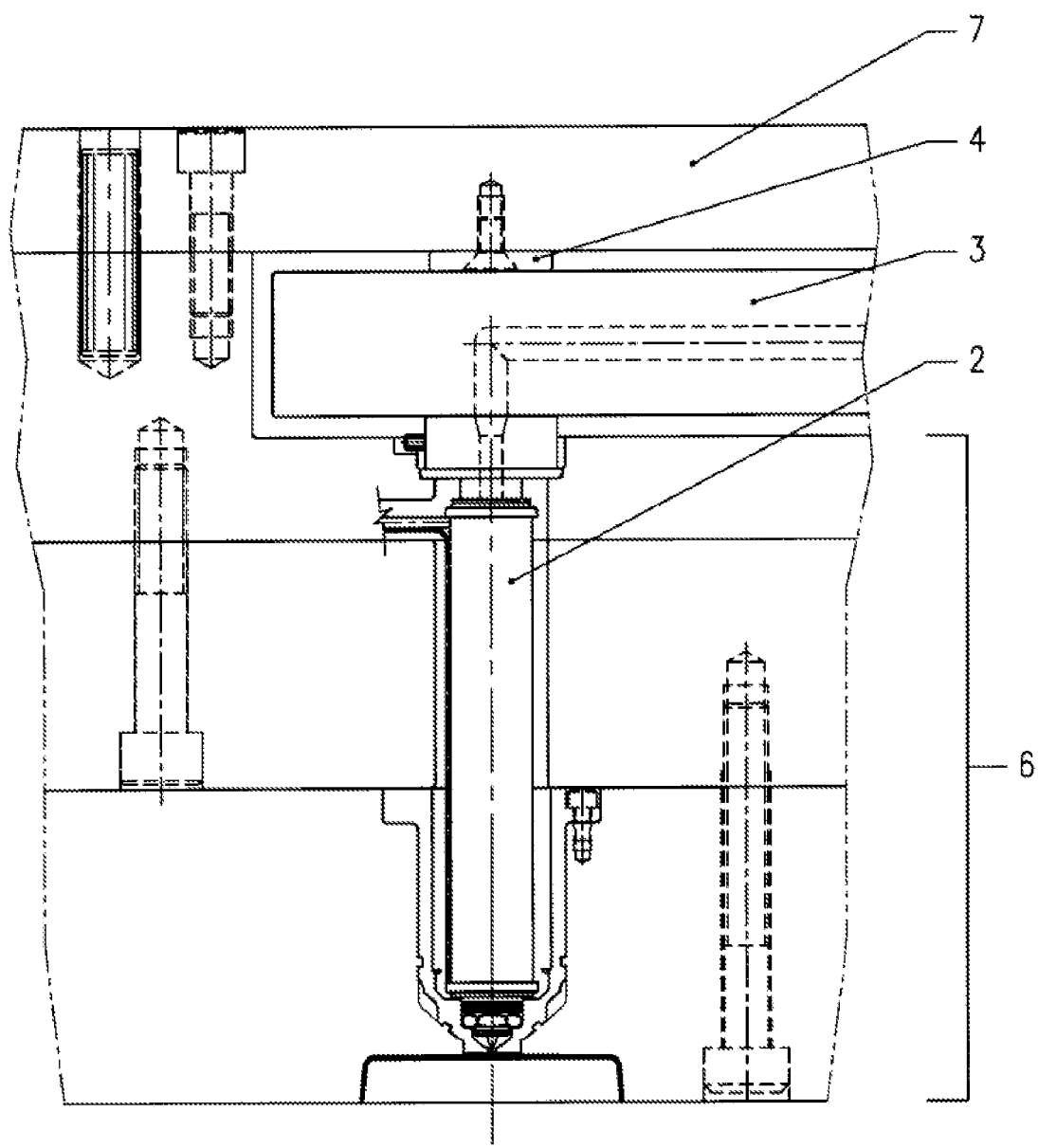
FIG. 1 is an exemplary vertical sectional view of an injection molding nozzle system according to the prior art.

With reference to FIG. 1, there is shown a typical prior art injection molding nozzle system. As shown, the typical prior art injection molding nozzle system includes a nozzle 2, a manifold 3, and a pressure pad 4 that are arranged between mold plates 6 and back plate 7. Such systems are typically designed to have a cold gap between the nozzle 2 and the manifold 3 of typically about 0.000" to 0.003" (inches), or even as high as 0.012" in some cases. The term "cold gap," as used herein, refers to the distance between the nozzle 2 and the manifold 3 at about room temperature or while the system is in a "cold state".

The typical nozzle/manifold assembly has an axial thermal expansion of 0.007"-0.017" (inches) when heated to an operating temperature, usually around 400° F. to 600° F. Consequently, in the typical prior art injection molding nozzle system, axial thermal expansion of the components of the system, as the system is heated to operating temperature, causes substantial pressure forces to be exerted on the manifold assembly, and on the mold plates and the fasteners securing them, when the system is at operating temperature. In addition, in some instances, lateral thermal expansion of the manifold also occurs as the system is brought to operating temperature which can give rise to lateral deflection of the nozzle 1, especially in instances where the nozzle 1 is secured or fastened directly to the manifold 3.

Figure 2A:
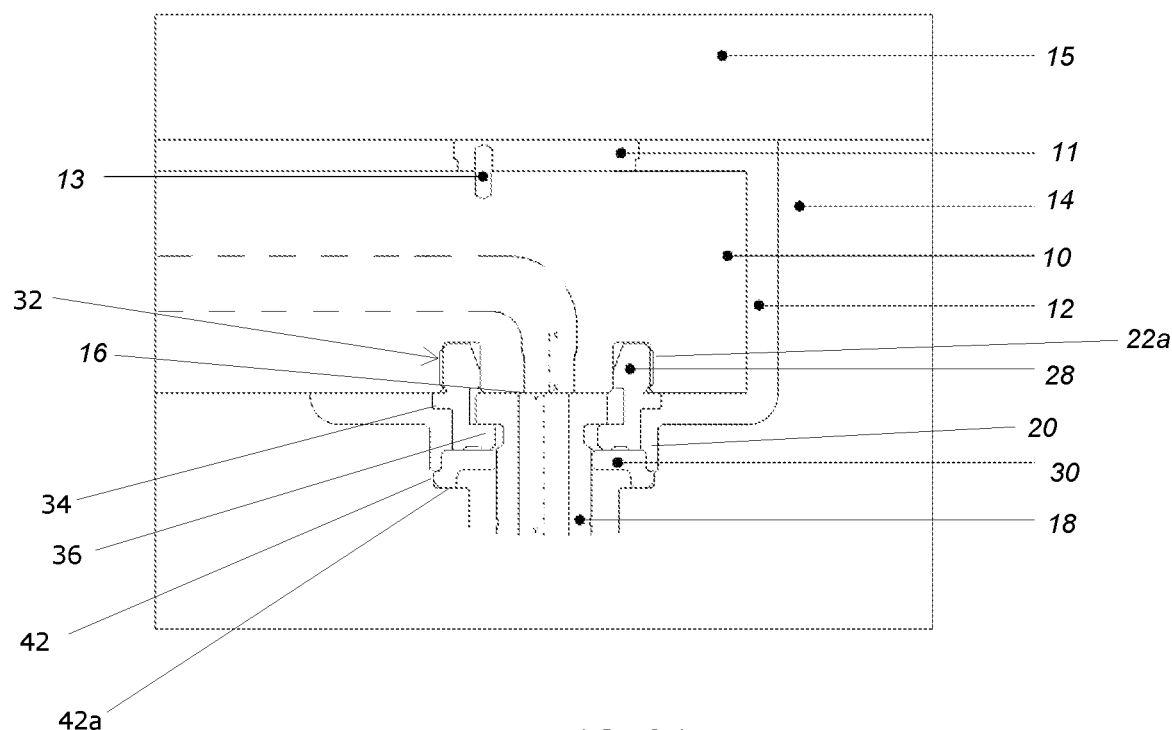
FIG. 2A is an exemplary vertical sectional view of an injection molding nozzle system according to another example embodiment of the prior art while the injection molding nozzle system is a cold state.
Figure 2B:
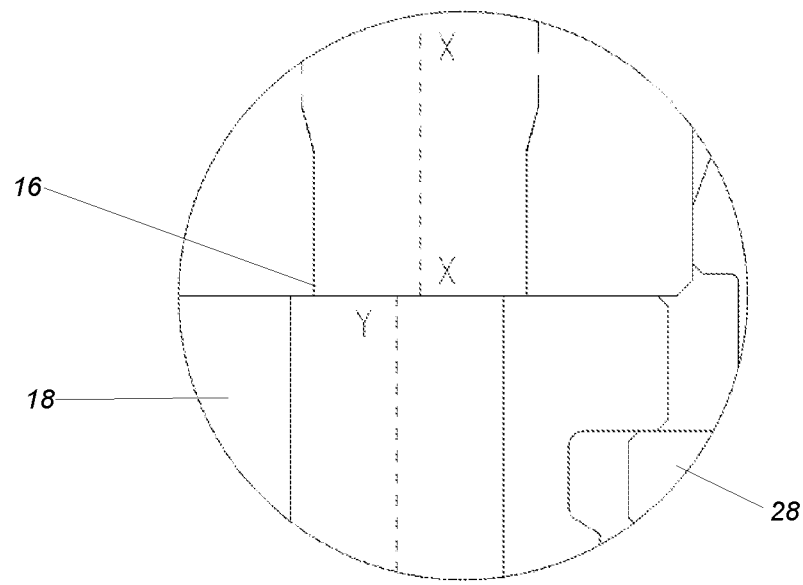
FIG. 2B is an enlarged, detail view of a portion of the prior art injection molding nozzle system of FIG. 2A.
Figure 3A:
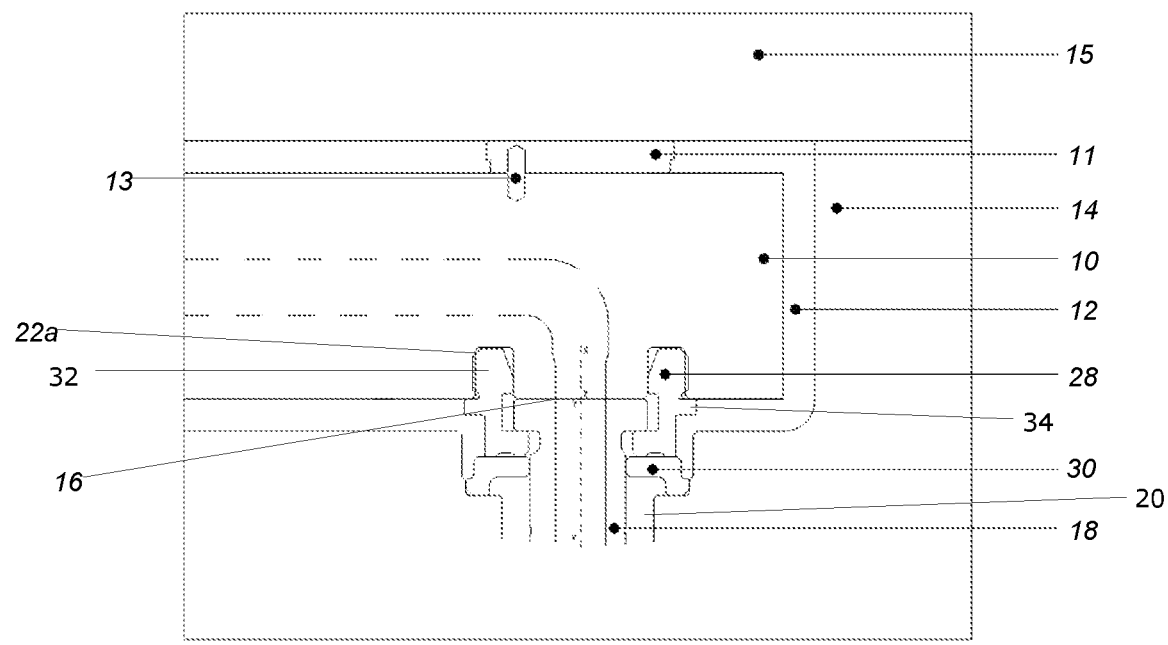
FIG. 3A is a vertical sectional view of the prior art injection molding nozzle system of FIG. 2A while the injection molding nozzle system is a hot or operational state.
Figure 3B:
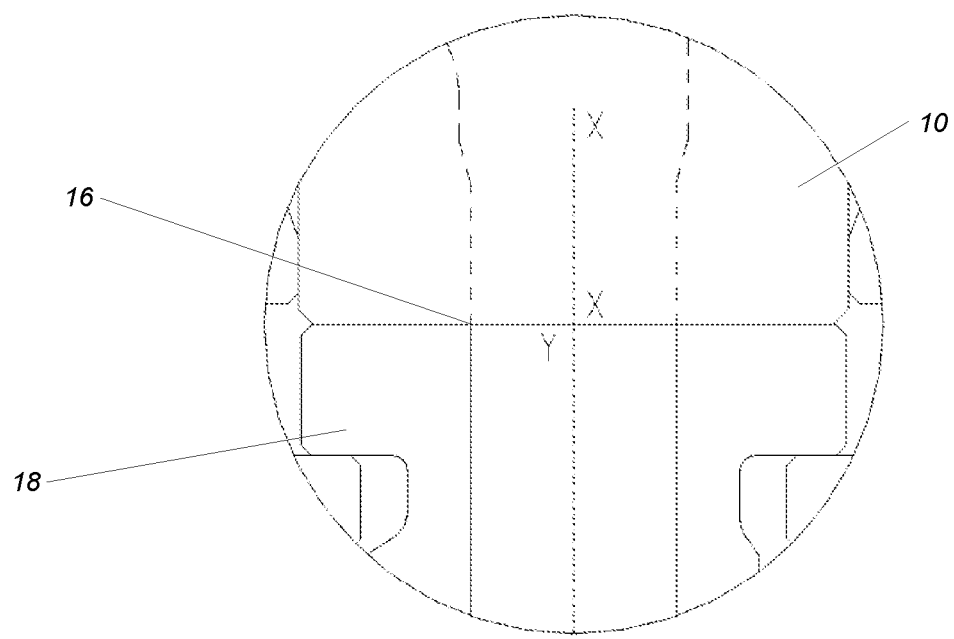
FIG. 3B is an enlarged, detail view of a portion of the prior art injection molding nozzle system of FIG. 3A.

With reference now to FIGS. 2A-2B and 3A-3B, there is shown another prior art injection molding nozzle system that has been configured to accommodate lateral thermal expansion of the manifold. In the prior art system illustrated in FIG. 2A, a manifold 10 is located in a first pocket 12 of a mold plate or manifold plate 14 and is backed by a pressure pad 11 that is secured to either back plate 15 (as is shown for example in the prior art embodiment of FIG. 1), or to the manifold 10 via dowel 13, as shown in FIG. 2A. The manifold 10 has an outlet hole 16 for directing the flow of molten plastic to a nozzle 18 that extends through a second pocket 20 formed in the manifold plate 14, the second pocket 20 extending from the first pocket 12. The manifold 10 includes an annular groove 22a that is arranged concentric with outlet hole 16.

The prior art configuration of FIG. 2A includes a collar 28 and a centering support ring 30 for securing the nozzle 18 relative to the manifold 10. The collar 28 has a first end 32 that is configured for being received within the annular groove 22a. The annular groove 22a and the first end 32 of the collar 28 include corresponding threaded surfaces such that the collar 28 is connected to the manifold 10 via a threaded connection and is, thus, centered about axis X-X of outlet hole 16. Collar 28 has an outwardly extending flange 34 and an inwardly extending shoulder portion 36 for engaging a corresponding outwardly extending flange on the nozzle 18. The shoulder portion 36 is configured to pinch the nozzle 18 against the manifold 10 via the threaded connection between the collar 28 and the annular groove 22a within the manifold 10.

The second pocket 20 of mold plate 14, has an axis Y-Y, and includes a centering cylindrical portion 42 and an inwardly extending shoulder portion 42a. A nozzle support ring 30 is disposed within the second pocket 20, the inwardly extending shoulder portion 42a of the pocket 20 acting as a stop for the support ring 30. The nozzle 30 extends through a central opening of the support ring 30, the support ring 30 serving to center the nozzle along axis Y-Y.

Accordingly, in the prior art system of FIG. 2A, the collar 28 and manifold 10 are secured together, at the threaded connection between the first end 32 of the collar 28 within the annular groove 22a of manifold 10, thereby forming a unit that is centered about axis X-X of the outlet hole 16 of the manifold 10. The support ring 30 and the nozzle 18, also form a unit (due to the insertion of the nozzle 18 through the central opening of the support ring 30) that is centered about axis Y-Y of the pocket 20. The system is designed with a preset lateral misalignment of axes X-X and Y-Y, as illustrated more clearly in FIG. 2B, while the system is in a cold state. As the system heats-up and is brought to operational temperature, lateral thermal expansion of the manifold 10 and mold plates 14 brings the axes X-X and Y-Y into alignment. Therefore, once the system reaches operational temperature or is brought to the operational state, the axis X-X associated with the outlet opening of the manifold 10 and the axis Y-Y associated with the inlet to the nozzle 18 are aligned due to the lateral thermal expansion of the manifold 10 and mold plates 14, as shown for instance in FIGS. 3A and 3B.

While the prior art system illustrated in FIGS. 2A-2B and 3A-3B allows for lateral thermal expansion of the components while avoiding lateral deflection of the nozzle 18 and reduces the pressure forces that are transferred to the manifold and/or to the mold plates and fasteners, which forces are induced as a result of axial thermal expansion of the components, manufacturing of the system illustrated in FIGS. 2A-2B and 3A-3B presents challenges. In particular, the prior art system relies specifically on the insertion of a specifically configured first end 32 of the collar 28 within an annular groove 22a that is formed within the manifold 10. Accordingly, the manifold 10 must be specifically machined to include annular groove 22a. The machining of annular groove 22a requires precise manufacturing to ensure that annular groove 22a is concentric with the outlet hole 16 of the manifold 10. The prior art system also relies on a threaded connection that is effected between the threaded outer surface of the first end of the collar 28 and the corresponding threaded outer surface or outer diameter of the annular groove 22a, which threaded connection secures the collar 28 relative to the manifold 10. The threaded connection between the collar 28 and the manifold 10, via insertion of the first end of the collar 28 within the annular groove 22a, is with effect that the collar 28 is concentric with or centered about the axis X-X that extends through the manifold outlet. Establishing the threaded connection between the collar 28 and the annular groove 22a formed in the manifold 10 requires threading the outer diameter of the collar 28 and threading the inner surface of the outer diameter of the annular groove 22a. The process of forming the annular groove 22a and threading the outer diameter of the annular groove 22a requires a thread milling process which is time-consuming, requires skilled machining techniques and, accordingly, is an expensive machining process. As well, given that the manifold for these systems is typically a large component, the thread milling process for forming the annular groove and threading the outer diameter of the annular groove presents challenges in terms of maneuvering and securing the manifold in position for thread milling along with the precision required to ensure the concentric arrangement of the annular groove 22a relative to the outlet opening 16 of the manifold 10. Therefore, while the prior art system illustrated in FIGS. 2A-2B, 3A-3B addresses some of the issues concerning nozzle deflection and high stress forces being transferred to the mold plates and fasteners that occurs due to the thermal expansion of the components as the system reaches operating temperature, a system that provides for effective sealing between the components and that also addresses issues of high manufacturing costs and overall manufacturing challenges is desirable.

Figure 4:
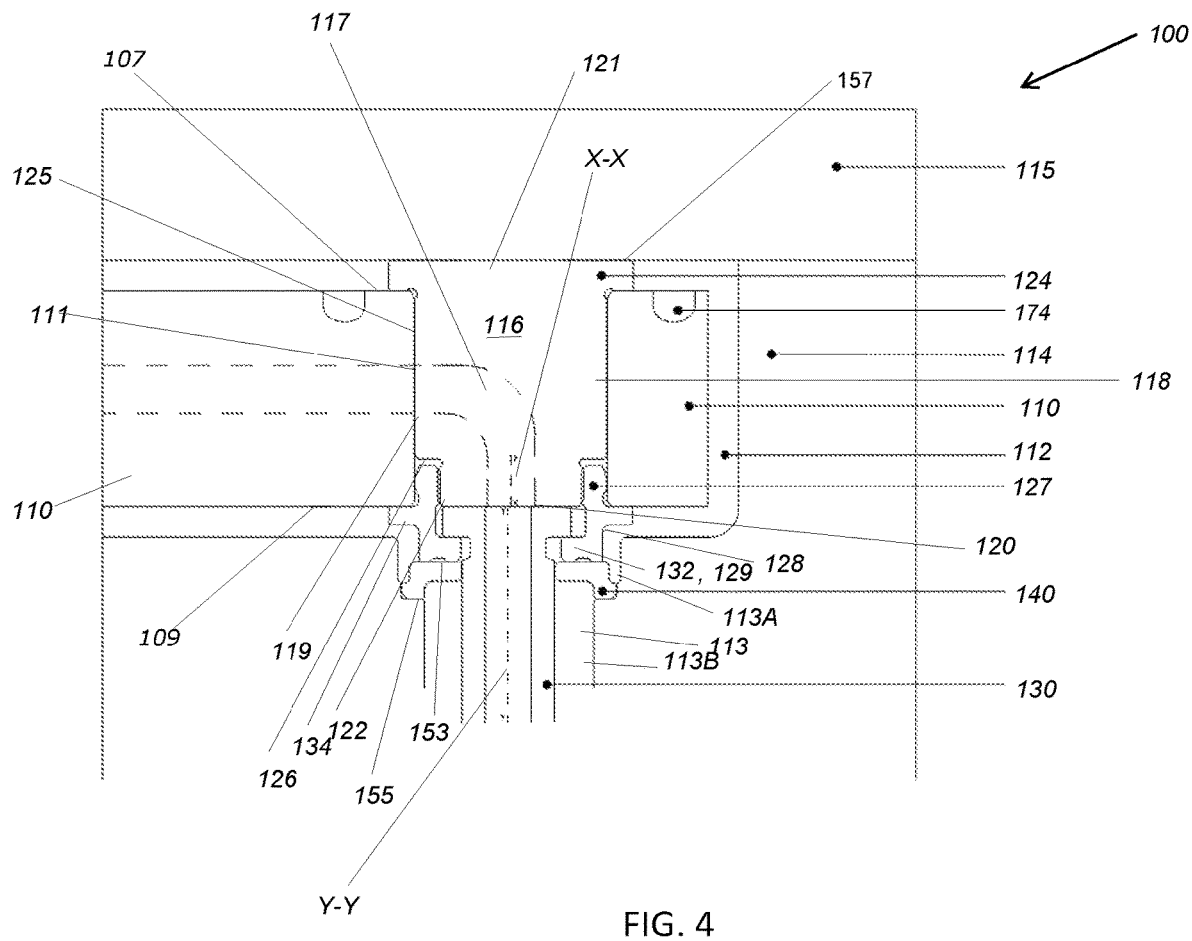
FIG. 4 is a vertical sectional view of an injection molding nozzle system according to an example embodiment of the present disclosure, while the injection molding nozzle system is a cold state.

Referring now to FIG. 4, there is shown an injection molding system 100 according to an example embodiment of the present disclosure. The system 100 includes a manifold 110 arranged within a manifold-receiving pocket 112 defined within a manifold plate 114. A back plate 115 secures and encloses the manifold 110 within the manifold-receiving pocket 112. A melt-transfer bushing 116 is disposed within and extends through an opening 125 in the manifold 110 from a first side 107 of the manifold 110 to a second side 109 of the manifold 110. The melt-transfer bushing 116 defines a melt-transfer passage 117 that extends through the body 118 of the melt-transfer bushing 116 for transferring molten material from the manifold 110 to a nozzle 130 that is secured to the melt-transfer bushing 116 via a collar 128.

The melt-transfer passage 117 extends from an inlet end or inlet opening 119 defined in the outer surface, or outer perimeter, of the body 118 of the melt-transfer bushing 116 to an outlet opening or melt-discharge opening 120, defined in an outlet end 122 of the melt transfer bushing 116 The melt-transfer passage 117 is configured such that molten material is received from the manifold 110 at the inlet opening 119 along a melt-receiving axis and is discharged from the melt-transfer bushing through the melt discharge or outlet opening 120 along a melt-discharge axis that is generally perpendicular to the melt-receiving axis.

Once the melt-transfer bushing 116 is positioned within the opening 125 provided in the manifold 110, the outlet opening 120 of the melt-transfer bushing 116 is centered about axis X-X such that the melt-discharge axis is aligned with axis X-X of opening 125. The inlet opening 119 of the melt-transfer bushing 116 is configured for receiving molten material from a corresponding outlet opening 111 on the manifold 110. The melt transfer passage 117 directs the received molten material to the outlet opening 120 defined in the outlet end 122 of the melt transfer bushing 116. The outlet opening 120 of the melt transfer bushing 116 is configured for directing molten material from the manifold 110 to the nozzle 130.

The nozzle 130 is disposed within the manifold plate 114 such that the nozzle extends into a nozzle-receiving pocket 113 defined within the manifold plate 114 and is in communication with a corresponding mold cavity (not shown), or a plurality of mold cavities via a network of passageways (not shown). While the system 100 is illustrated and described with reference to one such nozzle 130, it will be understood that a plurality of nozzles may be in use with the manifold 110, and that the system 100 may include a plurality of melt transfer bushings 116, each melt transfer bushing 116 cooperating with a corresponding nozzle 130 and collar 128, as necessitated by the scope of the system 100 or the particular application of the overall injection molding system 100.

The melt-transfer bushing 116 extends through opening 125, or bore, that is formed in the manifold plate 114. The melt-transfer bushing 116 has an outwardly extending flange 124 that extends outwardly from the end of the melt transfer bushing 116 that is disposed opposite to the outlet end 122 and outlet opening 120 of the melt-transfer bushing 116. Accordingly, in some embodiments, for example, the melt-transfer bushing 116 extends between a first end 121 and a second end, wherein the second end is the outlet end 122 that defines the outlet or melt-discharge opening 120. The outwardly extending flange 124 is configured for stationing the melt-transfer bushing 116 relative to the manifold plate 114 and extends radially outwardly from the first end 121 of the body 118 of the melt-transfer bushing 116. More specifically, the melt-transfer bushing 116 is configured such that disposition of the melt-transfer bushing 116 within opening 125 of the manifold 110 is such that the outwardly extending flange 124 is disposed in abutting contact with the first or rear surface 107 of the manifold 110, thereby positioning (or stationing) the melt-transfer bushing 116 relative to the manifold 110 within opening 125.

The outwardly extending flange 124 of melt transfer bushing 116 also serves as a pressure pad acting between the manifold 110 and the back plate 115 once the back plate 115 is secured or fastened relative to the manifold 110 and manifold plate 114 within the overall system 100. Accordingly, in the subject example embodiment, a pressure pad is incorporated within the structure of the melt-transfer bushing 116. By having the outwardly extending flange 124 of the melt-transfer bushing 116 provide the function of a pressure pad, the pressure pad forms part of the overall structure of the melt-transfer bushing 116 thereby reducing the overall number of components required for the system 100. This facilitates assembly of the overall system as the pressure pad is effectively installed within the system upon insertion of the melt-transfer bushing 116 within opening 125 of the manifold 110.

Figure 10:
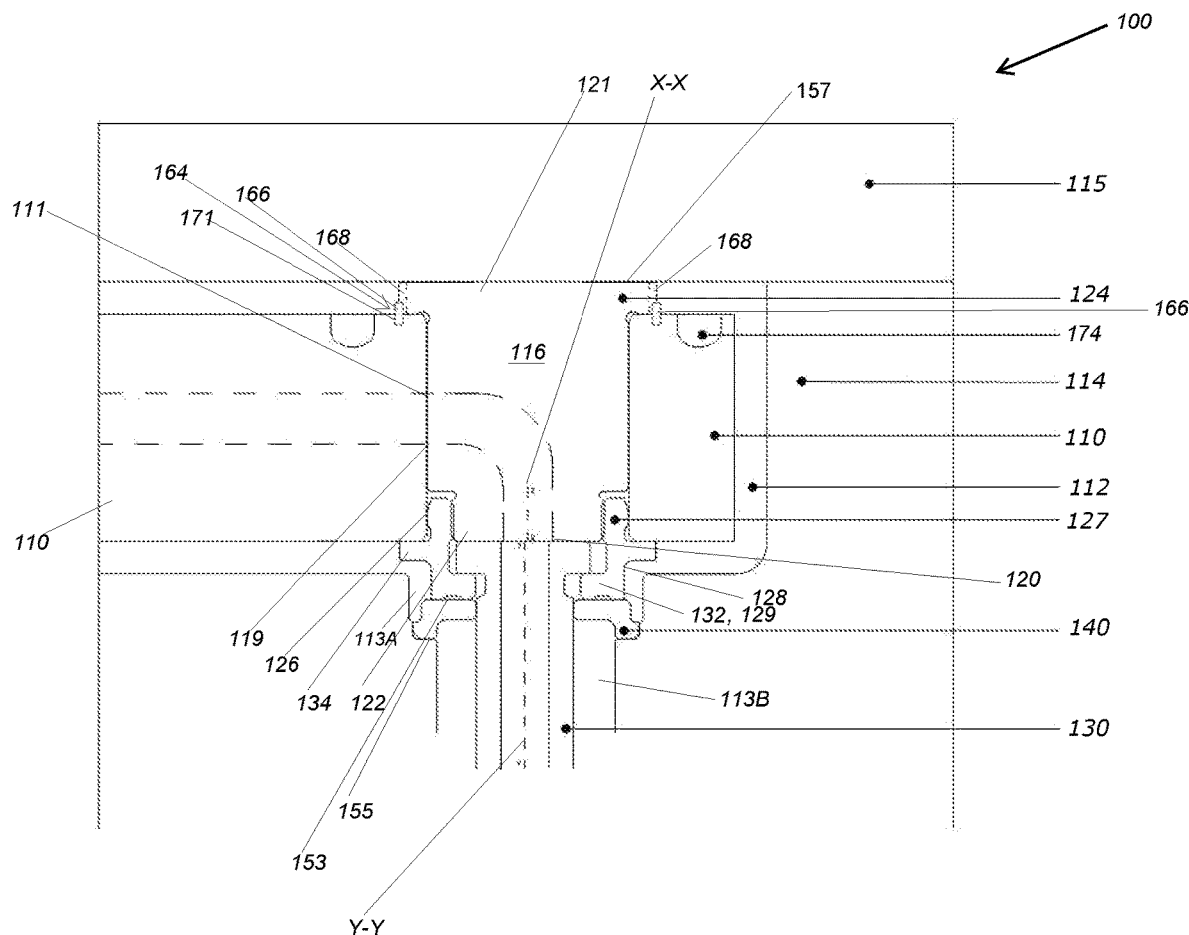
FIG. 10 is an alternate embodiment of the injection molding nozzle system of FIG. 4, according to another example embodiment of the present disclosure.
Figure 11:
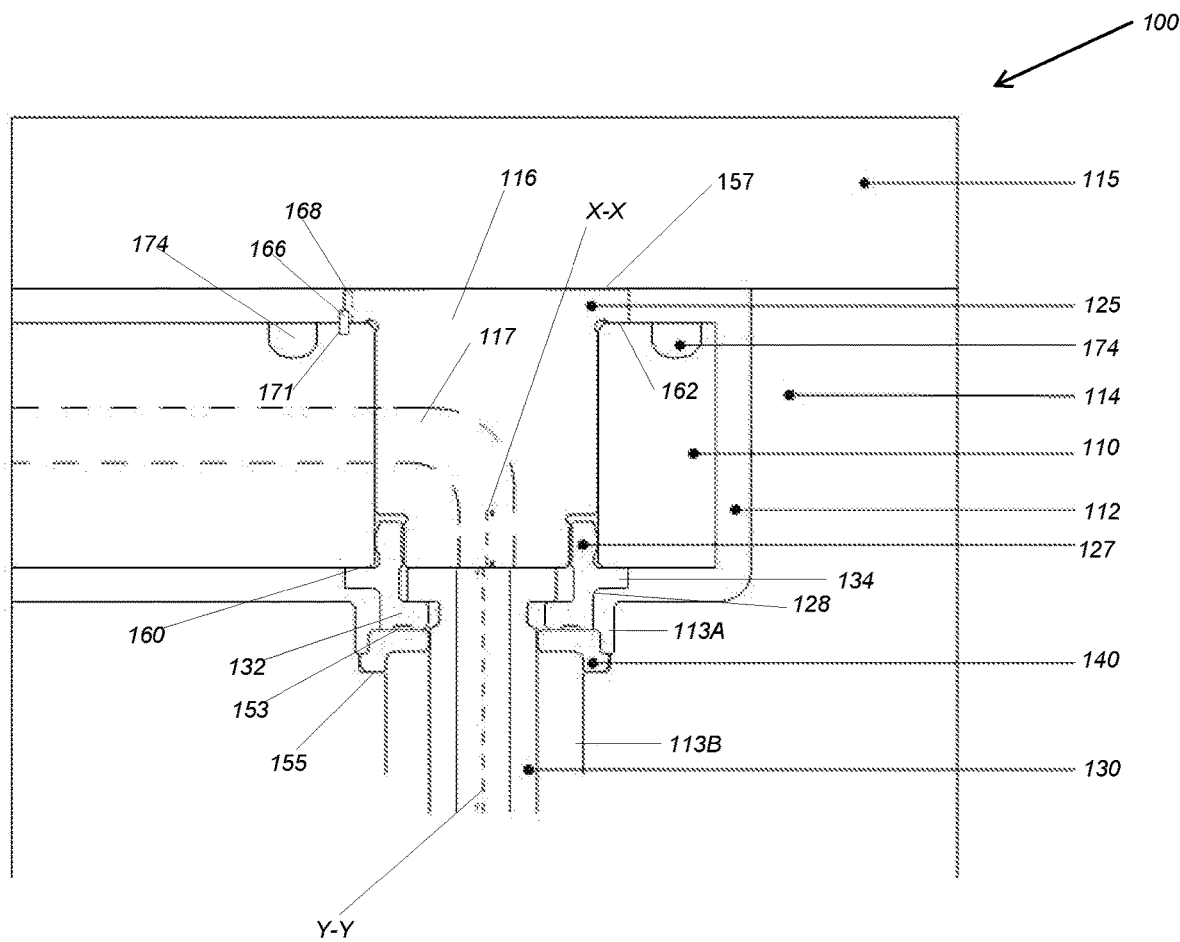
FIG. 11 is an alternate embodiment of the injection molding nozzle system of FIG. 10.

In some embodiments, for example, the system 100 includes a melt-transfer bushing securing device 164 that is configured for positioning the melt transfer bushing 116 relative to the manifold 110 within opening 125. In some embodiments, for example, the melt-transfer bushing securing device 164 also serves to resist rotation of the melt-transfer bushing 116 relative to the manifold 110. More specifically, as shown for instance in FIG. 11, in some embodiments, for example, the melt-transfer bushing securing device 164 includes at least one dowel 166 that is configured for cooperating with the outwardly-extending flange 124 of the melt transfer bushing 116. In some embodiments, for example, the melt-transfer bushing securing device 164 includes at least a pair of dowels 166, each dowel 166 being spaced apart from one another about the outwardly extending flange 124 of the melt transfer bushing 116, as shown for example in FIG. 10.

In some embodiments, for example, the at least one dowel 166 is configured for extending between a recess or groove 168 formed in the perimeter of the outwardly extending flange 124 of the melt transfer bushing 116 and a corresponding opening 171 formed in the rear or first surface 107 of the manifold 110. The dowel 166 serves to assist with alignment and positioning of the melt-transfer bushing 116 relative to the manifold 110 within opening 125. Accordingly, in some embodiments, for example, the at least one dowel 166, the manifold 110 and the melt-transfer-bushing 116 are cooperatively configured such that disposition of the melt transfer bushing 116 within the opening 125 of the manifold 110, such that the outwardly extending flange 124 is disposed in abutting contact with the first or rear surface 107 of the manifold 110, is such that the at least one dowel 166 engages or is disposed within the corresponding groove or recess 168 formed in the perimeter of the outwardly extending flange 124 with effect that the melt-transfer bushing 116 is centered within opening 125 and rotation of the melt-transfer bushing 116 relative to the manifold 110 is prevented.

While the melt-transfer bushing securing device 164 has been described in connection with at least one dowel 166, it will be understood that any suitable or fastener, as is known in the art, may be used for positioning and securing the melt-transfer bushing 116 relative to the manifold 110 such that the melt-transfer bushing 116 is centered within opening 125 of the manifold 110 and rotation of the melt transfer bushing 116, relative to the manifold 110, is resisted and/or prevented.

Figure 12:
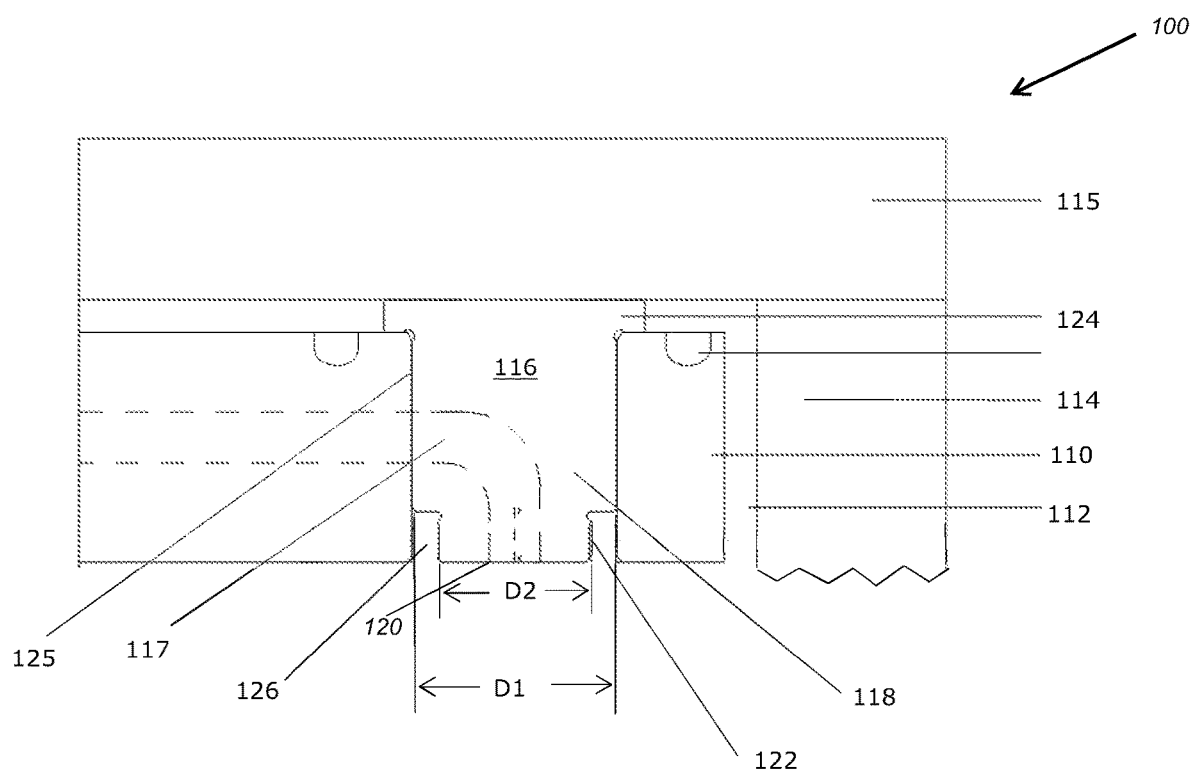
FIG. 12 is a partial vertical sectional view of the injection molding nozzle system of FIG. 4, with the nozzle and collar removed for ease of illustration.

With reference now to FIG. 12, the outlet end 122 of the melt-transfer bushing 116 is configured such that the outlet end 122 has an outer diameter, "D2", that is less than the outer diameter, "D1", of the body 118 of the melt transfer bushing 116. In this respect, disposition of the melt transfer bushing 116 within the opening 125 of the manifold plate 110 is with effect that an annular gap 126 is defined between the outer surface of the outlet end 122 of the melt-transfer bushing 116 and the inner surface of the opening 125 defined within the manifold 110. Therefore, the annular gap 126 surrounding the outlet opening 120 that transfers the molten material from the melt-transfer bushing 116 to the nozzle 130, is configured for receiving an upper or first end of the collar 128 that is configured for securing the nozzle 130, relative to the manifold 110, via releasable connection with the melt-transfer bushing 116.

With reference now to FIGS. 4-10, the collar 128 extends between a first end 127 that is configured for releasable connection to the outlet end 122 of the melt transfer bushing 116, and a second end 129 and has a central opening extending therebetween through which the nozzle 130 extends. The second end 129 includes an inwardly extending flange 132 such that the central opening defined at the first end 127 of the collar 128 has a diameter or opening that is larger than the diameter or opening defined by the second end 129 of the collar 128.

The collar 128 further includes an outwardly extending flange 134 that extends radially outwardly from the collar 128 intermediate the first end 127 and the second end 129. A central opening extends though the collar 128, the central opening having a first portion 135 that extends from the first end 127 and terminates at a shoulder surface 133 defined by the inwardly extending flange 132, and a second portion 137 defined by a cylindrically-extending surface, or end surface 138, of the inwardly extending flange 132. The second portion 137 of the central opening, therefore, has a diameter that is less than the diameter of the first portion 135 of the central opening of the collar 128. The larger diameter first portion 135 of the central opening of the collar 128 facilitates insertion of the nozzle 130 within the collar 128 such that the nozzle body 130A extends through the central opening.

The nozzle 130 includes a flanged end 131 that is configured for being received within the first portion 135 of the central opening of the collar 128. Therefore, once the nozzle 130 is disposed or inserted within the collar 128, the flanged end 131 of the nozzle 130 engages the shoulder surface 133 defined by the inwardly extending flange 132 that is defined at the second end 129 of the collar 128, with the remaining body of the nozzle 130 extending through the second portion 137 of the central opening of the collar 128.

The first end 127 of the collar 128 is configured for releasable connection to the outlet end 122 of the melt-transfer bushing 116. In some embodiments, for example, the releasable connection between the first end 127 of the collar 128 and the outlet end 122 of the melt-transfer bushing 116 is effected via a threaded connection between a threaded inner surface 139 of the first portion 135 of the central opening of the collar 128 and a corresponding threaded outer surface 123 of the outlet end 122 of the melt-transfer bushing 116. The collar 128 is configured such that the inwardly extending flange 132 is spaced-apart from the first end 127 such that, securing of the nozzle 130 to the melt-transfer bushing, via the collar 128, is with effect that the flanged end 131 of the nozzle 130 is disposed between and in contact with an end surface of the outlet end 122 of the melt-transfer bushing 116 and the shoulder surface 133 of the inwardly extending flange 132. In this respect, securing of the nozzle 130 to the melt transfer bushing 116, via the securing of the collar 128 to the outlet end 122 of the melt transfer bushing 116, is such that the flanged end 131 of the nozzle 130 is disposed in abutting contact with the end surface of the outlet end 122 of the melt-transfer bushing 116, while the opposite side of the flanged end 131 of the nozzle 130 is disposed in abutting contact with the shoulder surface 133 of the inwardly extending flange 132 of collar 128.

In some embodiments, for example, the outer surface of the collar 128 is shaped to facilitate installation of the collar 128 onto the outlet end 122 of the melt-transfer bushing 116. In this respect, the outer surface of the collar 128 may include a pair or a series of opposing flat surfaces and, in some instances, may have a hexagonal or an octagonal shape configured for engagement with a corresponding tool, such as a corresponding torque wrench. Installation of the collar 128 onto the outlet end 122 of the melt transfer bushing 116 is also facilitated by the melt-transfer bushing securing device 164 which serves to prevent rotation of the melt transfer bushing 116, relative to the manifold 110, in response to torquing of the collar 128 relative to the melt transfer bushing 116.

Figure 6:
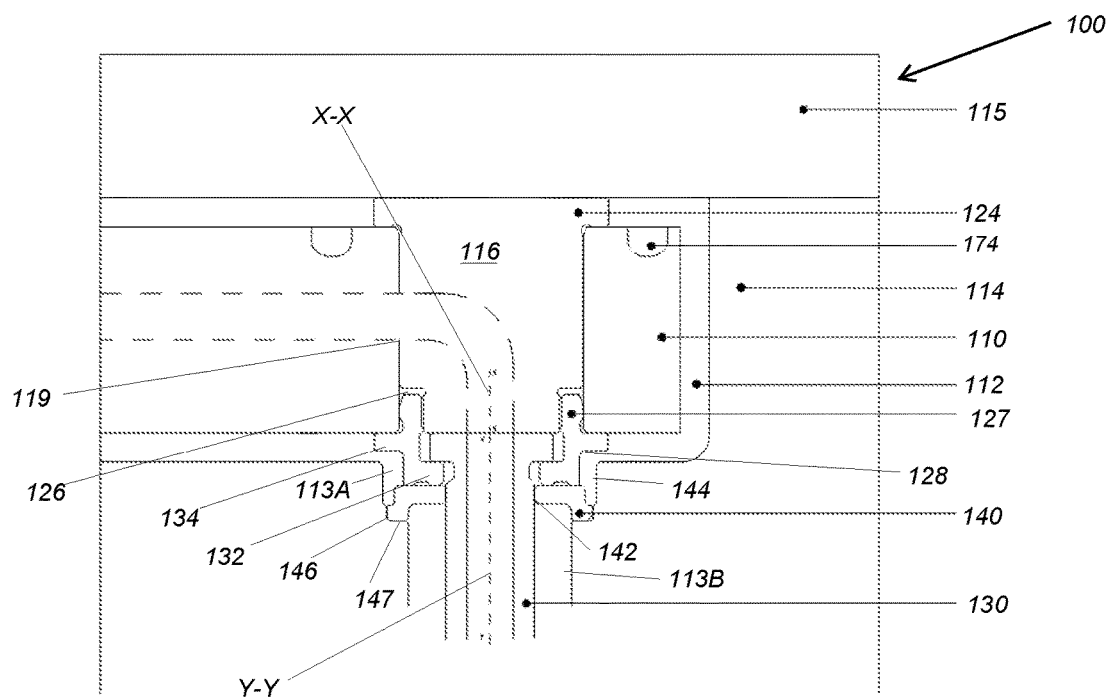
FIG. 6 is a vertical sectional view of an injection molding nozzle system according to an example embodiment of the present disclosure while the injection molding nozzle system is at operational temperature or in a hot state.

With reference now to FIG. 6, the system 100 further includes a nozzle support ring 140 that is configured for being received within a first portion 113A of the nozzle-receiving pocket 113 of the manifold plate 114. The nozzle support ring 140 defines a central opening 142 that is configured for receiving the nozzle body 130A. In some embodiments, for example, the first portion 113A of the nozzle-receiving pocket 113 has a lead-in portion 144 and a centering cylindrical portion 146 that terminates at an inwardly extending shoulder surface 147. The second portion 113B of the nozzle-receiving pocket 113 is a clearance portion that extends into the manifold plate 114. The nozzle-receiving pocket 113 extends into the manifold plate 114 along axis Y-Y.

In some embodiments, for example, the lead-in portion 144 of the first portion 113A of the nozzle-receiving pocket 113 is conical in shape. In other embodiments, for example, the lead-in portion 144 of the first portion 113A of the nozzle-receiving pocket 113 is cylindrical in shape. In some embodiments, for example, the lead-in portion 144 of the first portion 113A of the nozzle-receiving pocket 113 is a combination of conical and cylindrical in shape. In some embodiments, for example, the lead-in portion 144 of the first portion 113A of the nozzle-receiving pocket 113 may have a stepped cylindrical shape, or be of any suitable configuration provided that the lead-in portion 144 provides sufficient clearance for receiving the nozzle support ring 140 such that the nozzle support ring 140 may be seated relative to the inwardly extending shoulder surface 147. Accordingly, in some embodiments, for example, the inwardly extending shoulder surface 147 serves as a stop for ensuring that the nozzle support ring 140 remains positioned within first portion 113A of the nozzle-receiving pocket 113. Accordingly, in this respect, the lead-in portion 144 is configured such that the overall diameter, or receiving area, provided by the lead-in portion 144 is larger than the overall diameter, or receiving area, defined by the centering cylindrical portion 146 to allow for easy insertion of the nozzle support ring 140 into the pocket 113. Clearance portion 113B extends into the manifold plate 114 and is configured to accommodate the nozzle body 130A.

The centering cylindrical portion 146 is sized and configured for centering the nozzle support ring 140 about axis Y-Y of the nozzle-receiving pocket 113. Accordingly, the nozzle support ring 140 is configured such that disposition of the support ring 140 within the centering cylindrical portion 146 of the nozzle-receiving pocket 113 is with effect that the outer surface of a corresponding centering portion 150 of the nozzle support ring 140 is disposed in contact with the centering cylindrical portion 146 of the nozzle-receiving pocket 113 such that the central opening 142 of the nozzle support ring 140 is concentric with the centering cylindrical portion 146 and is, therefore, centered about axis Y-Y. The centering of the central opening 142 of the nozzle support ring 140 about axis Y-Y is such that, when the nozzle body 130A is disposed within and extends through the central opening 142 of the nozzle support ring 140 upon assembly, the nozzle 130 is centered relative to axis Y-Y such that the nozzle passage axis of the molten material passage defined by the nozzle 130 is aligned or concentric with axis Y-Y of the nozzle-receiving pocket 113B. In this respect, the central opening 142 of the nozzle support ring 140 is configured such that extension of the nozzle body 130A through the central opening 142 is with effect that the outer surface of the nozzle body 130A is disposed in contact with the corresponding surface of the support ring 140 that defines the diameter of the central opening 142. Accordingly, the nozzle support ring 140 supports the nozzle 130 relative to the manifold plate 114 such that lateral movement of the nozzle 130 relative to the manifold plate 114 is resisted due to interference between the nozzle support ring 140 and the manifold plate 114 and interference between the nozzle body 130A and the nozzle-support ring 140

Figure 5:
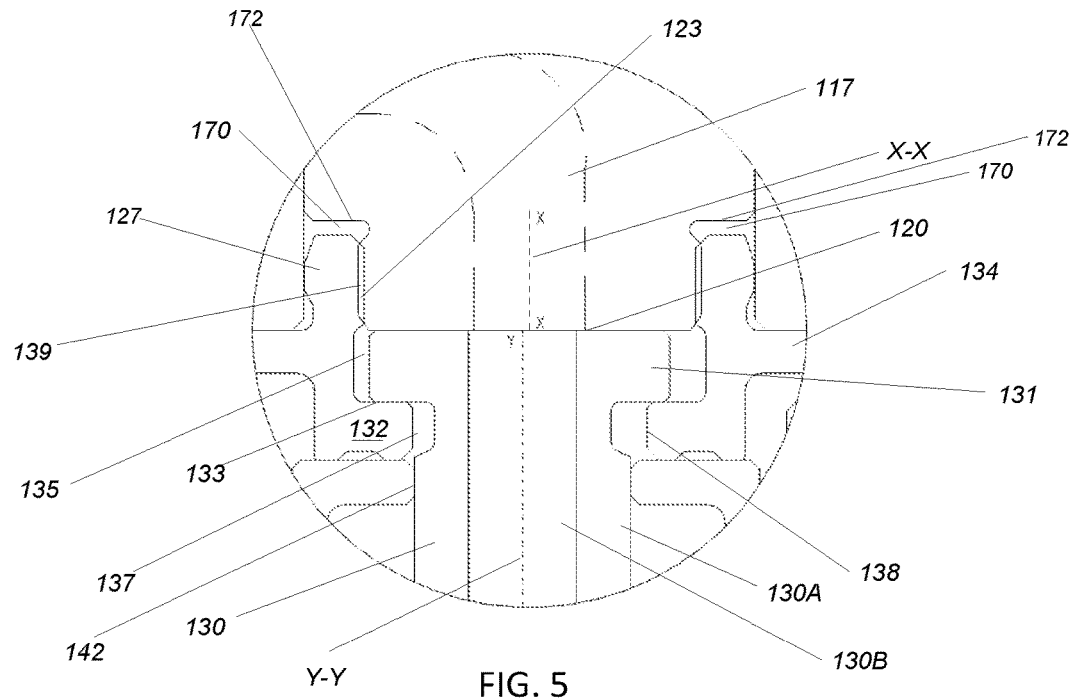
FIG. 5 is a detail view illustrating the misalignment of the nozzle with the manifold of the injection molding nozzle system of FIG. 4 while the injection molding nozzle system is in the cold state.

With reference now to FIG. 5, assembly of the system 100 is such that the collar 128 and the melt-transfer bushing 116, together with the manifold 110, form a unit that is centered about axis X-X of outlet opening 120 of the melt transfer bushing 116, while the nozzle 130 and the nozzle support ring 140 form a unit that is centered about axis Y-Y of the nozzle-receiving pocket 113 of the manifold plate 114. The system 100 is designed such that, while the system 100 is in a cold state, or in a non-operating condition (i.e. at room temperature or ambient temperature or a temperature that is less than the optimal or predetermined operating temperature), the system 100 includes a predetermined or preset lateral misalignment of the axes X-X and Y-Y as shown in FIG. 5. Accordingly, while the system is in a non-operational state wherein the system is at a temperature that is less than a predetermined operating temperature, the outlet center of the melt-transfer bushing and the inlet center of the molten material passage of the nozzle are offset relative to one another in a lateral direction that extends perpendicular to the melt discharge axis and to the nozzle passage axis. The preset lateral misalignment or offset, as shown in detail view in FIG. 5, is specifically configured such that the axes X-X and Y-Y become aligned with one another as the system 100 reaches operating temperature or becomes disposed in an operating condition or operational state.

More specifically, as the system 100 heats-up and is brought to an operational state wherein the system 100 is at a predetermined operating temperature, the manifold 110 and the nozzle 130 each, independently, reach respective operating temperatures such that the manifold 110 and the nozzle 130 each, independently, undergo lateral thermal expansion. In some embodiments, for example, the manifold plate 114 also undergoes lateral thermal expansion as the system 100 is brought to operating temperature. The lateral thermal expansion of the components within the system 100 that occurs as the system 100 is brought to operating temperature brings the axis X-X of the outlet opening 120 of the melt bushing 116 and the axis Y-Y of the nozzle-receiving pocket 113 of the manifold plate 114 into alignment such that the nozzle passage axis defined by the nozzle melt passage 130B is axially aligned with the melt-discharge axis of the outlet opening 120 of the melt-transfer bushing 116. See, for instance, FIGS. 6 and 7, which illustrate the system 100 at operating temperature with the axes X-X and Y-Y in alignment. Axial alignment of the axis X-X of the outlet opening 120 of the melt bushing 116 with the axis Y-Y, along which the melt passage 130B of the nozzle 130 extends, is important to ensure that leakage of molten material at the interface between the melt bushing 116 and the flanged end 131 of the nozzle 130 is prevented. Lateral shifting of the nozzle 130 relative to the melt-transfer bushing 116 to bring the axis X-X of the melt-transfer bushing outlet opening 120 into alignment with axis Y-Y of the nozzle inlet opening is permissible due to the configuration of the collar 128 which provides lateral clearance within the first portion 135 of the central opening of the collar 128 to allow for lateral movement of the nozzle 130 relative to the melt-transfer bushing 116 that occurs due to lateral thermal expansion of the components of the system 100. By allowing for lateral thermal expansion of the manifold 110 with the melt transfer bushing 116 relative to the flanged end 131 of the nozzle 130, due to the configuration of the collar 128, the likelihood of nozzle deflection within the system 100, as the system reaches operating temperature, is reduced and/or prevented which also serves to reduce the likelihood of leakage between the nozzle 130 and the outlet opening 120 of the melt-transfer bushing 116.

In addition to the preset lateral misalignment or preset offset of the axes X-X and Y-Y, in some embodiments, for example, the system 100 further includes one or more cold gaps that are designed within the system 100 while the system 100 is at ambient temperature, or in a cold, non-operational state. In some embodiments, for example, a cold gap is provided at the interface between the second end 129 of collar 128 and the nozzle support ring 140 (i.e. between nozzle support ring 140 and the bottom surface of the inwardly extending flange 132 of the collar 128). In some embodiments, for example, a cold gap is provided at the interface between the nozzle support ring 140 and the inwardly extending shoulder surface 147 of the first portion 113A of the nozzle-receiving pocket 113. In some embodiments, for example, cold gaps are provided at both the interface between the second end 129 of collar 128 and the nozzle support ring 140 and at the interface between the nozzle support ring 140 and the inwardly extending shoulder surface 147 of the first portion 113A of the nozzle-receiving pocket 113. Accordingly, in some embodiments, for example, the cold gap provided between the second end 129 of collar 128 and the nozzle support ring 140 (i.e. between nozzle support ring 140 and the bottom surface of the inwardly extending flange 132 of the collar 128) when the system 100 is at ambient temperature, or in a cold non-operational state is a first cold gap 153, while the cold gap provided at the interface between the nozzle support ring 140 and the inwardly extending shoulder surface 147 of the first portion 113A of the nozzle-receiving pocket 113 is a second cold gap 155. In some embodiments, for example, a further cold gap 157 may be provided at the interface between the flanged end 121 of the melt-transfer bushing 116 and the back plate 115 of the system 100.

The size or dimension of the one or more cold gaps that is included in the overall system 100 will vary depending on the particular application and the design of the individual components that make up the system 100 as the size of any cold gap is ultimately dependent on the expected thermal growth of the manifold, and any other components within the system. This will depend, for example, on the thickness of the manifold and/or the structure of the other components. The size of the total cold gap within the system 100 is ultimately dictated by the expected thermal growth of the components within the system 100 as the system 100 reaches operating temperature as the thermal growth of the components must be sufficient to ensure that any cold gap that is included in the system is reduced to zero once the system 100 reaches operating temperature. For example, in some embodiments, the system 100 is configured such that the one or more cold gaps provided within the system 100 amount to a total cold gap within the overall system 100 of between 0.001-0.008 inches. In this respect, in embodiments that include both a first cold gap 153 at the interface between the second end 129 of collar 128 and the nozzle support ring 140 (i.e. between nozzle support ring 140 and the bottom surface of the inwardly extending flange 132 of the collar 128), and a second cold gap 155 at the interface between the nozzle support ring 140 and the inwardly extending shoulder surface 147 of the first portion 113A of the nozzle-receiving pocket 113, each of the first cold gap 153 and the second cold gap 155 may be between 0.001-0.004 inches such that the combined cold gap provided by the first cold gaps 153 and the second cold gap 155 does not exceed a predetermined maximum that represents the maximum thermal growth within the system 100. In some embodiments, for example, the one or more cold gaps that are designed into the overall system 100 to account for the axial thermal growth of the components are referred to as preloads that are present within the system 100 when system 100 is at ambient or assembly temperature.

With the one or more cold gaps designed into the system 100, for example first cold gap 153, second cold gap 155 and/or third cold gap 157, the reducing of the one or more cold gaps to zero, as the system reaches its predetermined operating temperature is with effect that forces are transmitted to the overall assembly due to the axial thermal growth of the components. In some embodiments, for example, the forces that are transmitted to components within the assembly due to the closing of the one or more cold gaps 153, 155 are referred to as pressurized loads that are achieved once the system 100 reaches operating temperature. In conventional systems, for example the prior art system of FIG. 1, the forces resulting from the axial thermal growth, or expansion, of the components were often transferred to the mold plates, such as the manifold plate and back plate, as well as the fasteners used for securing the mold plates together. In such prior art systems, the axial thermal growth, or expansion, of the components would result in the mold plates and fasteners being put under considerable stress and/or strain. In the subject configuration, by incorporating cold gaps 153, 155 into the system 100, much smaller forces are transferred back onto the manifold 110 due to the configuration and arrangement of the collar 128 and support ring 140 and their interaction with each other and with the manifold 110. In particular, in the system 100 of the present disclosure, axial thermal growth, or expansion, of the components results in the closing of the preset one or more cold gaps 153, 155 which, in turn, results in much smaller forces being transferred to the manifold 110 as the system 100 is brought to operational temperature. In the subject example embodiment, the closing of first and second cold gaps 153, 155, each in the range of 0.001-0.004 inches, effects transmission of pressurized loads on the manifold 110 (due to the axial thermal growth of components) on the order of 0.000-0.001 inches once the system 100 is at operating temperature. By incorporating mechanical preloads (i.e. cold gaps) into the system 100 that are set at ambient temperature, and by directing the pressurized forces or loads back onto the manifold 110, via pressure applied by the support ring 140 and collar 128 to manifold 110, rather than on to the mold plates and/or corresponding fasteners as the system 100 reaches operating temperature, the stress and strain caused by axial thermal expansion of the components within the system 100 is controlled and is prevented from being transferred back on to the mold plates and corresponding fasteners, thereby protecting the mold plates and fasteners from undue forces. This reduces the overall stress and/or strain applied to the mold assembly which can serve to extend the overall life of the mold assembly as well as the overall life of some of the individual components of the mold assembly and the overall system 100.

Figure 8:
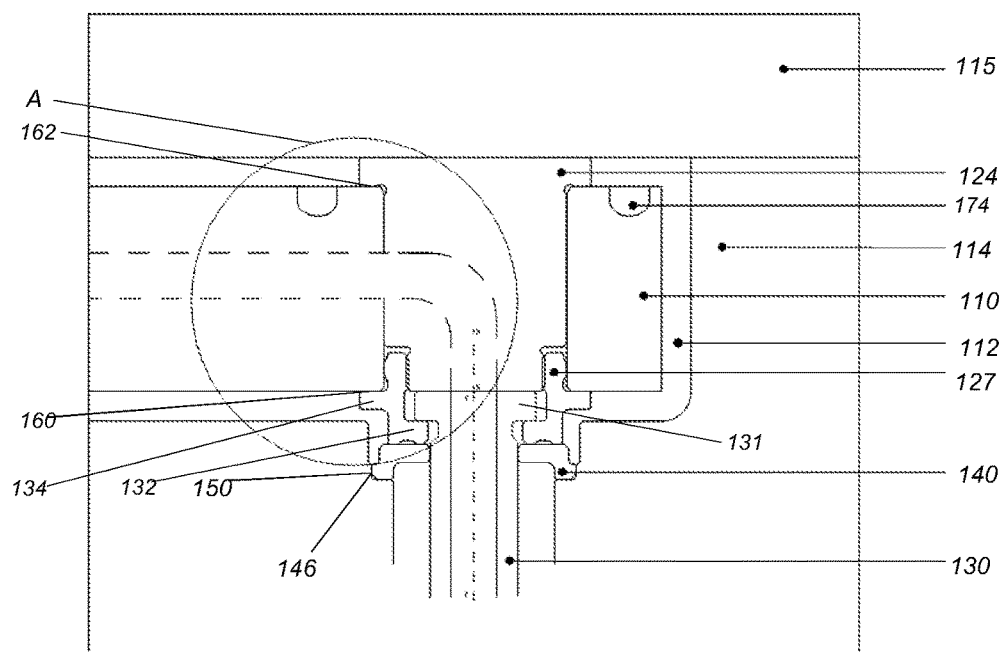
FIG. 8 is a vertical sectional view of an injection molding nozzle system according to an example embodiment of the present disclosure while the injection molding nozzle system is at operational temperature.
Figure 9:
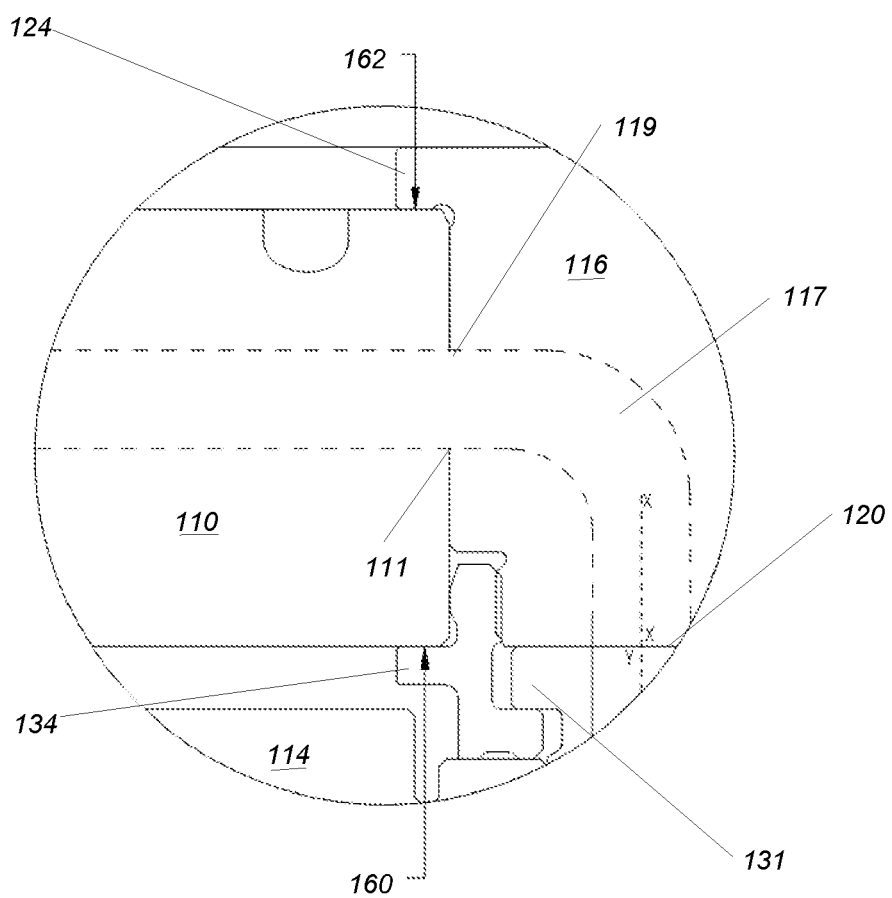
FIG. 9 is a detail view of the encircled area A shown in FIG. 8.

With reference now to FIGS. 8 and 9, assembly of the system 100 will now be described in further detail. As set out above, nozzle 130 is arranged within collar 128, with the nozzle 130 extending through the central opening and the flanged end 131 of the nozzle 130 being retained in the collar 128 by engagement of the flanged end 131 against the inwardly extending flange 132. The melt-transfer bushing 116 is disposed within the opening 125 in the manifold 110, with the flanged end 124 of the melt-transfer bushing 116 stationing the bushing relative to the manifold 110. The collar 128, together with the nozzle 130, may be hand-torqued or otherwise fastened, relative to the melt-transfer bushing 116, such that the collar 128 is releasably coupled to the outlet end 122 of the melt-transfer bushing 116. The first end 127 of the collar 128 is received within the annular gap 126 that is provided between the outlet end 122 of the melt-transfer bushing 116 and the inner surface of the bore or opening 125 formed in the manifold 110. The releasable coupling of the collar 128 to the melt-transfer bushing 116, via the threaded connection, is with effect that the flanged end 131 of the nozzle 130 is compressed against the outlet end 122 of the melt-transfer bushing 116. Additionally, the releasable coupling of the collar 128 to the melt-transfer bushing 116, via the threaded connection, is with effect that the outwardly extending flange 124 of the melt-transfer bushing 116 is pulled downwards against the first surface 107 of the manifold such that a first sealing force is applied against the first side of the manifold 110 in a first direction by the outwardly extending flange 124 of the melt-transfer bushing 116. The first sealing force is effective to establish a sealed interface or pinch point 162 between the outwardly extending flange 124 of the melt-transfer bushing 116 and the first side of the manifold 110.

Additionally, as the collar 128 (with nozzle 130) is releasably coupled to the melt-transfer bushing 116, the flanged end 131 of the nozzle 130 is brought into abutting contact with the end surface of the melt-transfer bushing 116 such that an upwards force is applied by the inwardly extending flange 132 of the collar 128 against the flanged end 131 of the nozzle 130 such that the flanged end 131 of the nozzle 130 is compressed against the end surface of the outlet end 122 of the melt-transfer bushing 116.

As well, as the collar 128 (with nozzle 130) is releasably coupled to the melt-transfer bushing 116, the outwardly extending flange 134 of the collar 128 is brought into abutting contact with the second side 109 of the manifold 110 with an upwards force or second sealing force being applied by the outwardly extending flange 134 of the collar 128 against the manifold 110 in a second direction that is opposite to the first direction of the first sealing force. The second sealing force is effective to establish a sealed interface or pinch point 160 between the outwardly extending flange 134 of the collar 128 and the second side 109 of the manifold 110.

The configuration of the inwardly and outwardly extending flanges 132, 134 of the collar 128 is such that the amount of force (or preload) applied to the flanged end 131 of the nozzle 130 by inwardly extending flange 132 of the collar 128 as the collar 128 is being releasably coupled to the melt-transfer bushing 116 is controlled, in part, by the outwardly extending flange 134 contacting the manifold 114, to ensure that relative movement between the nozzle and the manifold and melt-transfer bushing 116 in a lateral direction is permitted. In particular, the contact between the outwardly extending flange 134 and the manifold 110 is such that the amount of torque that can be applied to the nozzle 130, via the collar 128 as the collar 128 is releasably coupled to the melt-transfer bushing 116 is limited such that over-torquing of the collar 128, relative to the melt-transfer bushing 116 and the manifold 110 is prevented. Accordingly, in some embodiments, the system 100 includes a pre-load at the interface between the flanged end 131 of the nozzle 130 and the end surface of the melt-transfer bushing 116 so that as the collar 128 is releasably coupled to the melt-transfer bushing 116 at ambient temperature, a first pre-load is effected between the flanged end 131 of the nozzle 130 and the melt transfer bushing 116, via the inwardly extending flange 132 of the collar 128. The preload is sufficient to ensure a sealed interface is effected between the flanged end of the nozzle 131 and the outlet end 122 of the melt-transfer bushing 116 while still allowing for lateral movement of the nozzle relative to the melt-transfer bushing 116 and manifold 114. Additionally, as the collar 128 is releasably secured to the melt-bushing 116, in some embodiments, for example, a further or second pre-load, may be built into the system 100 at the interface between the outwardly extending flange 134 of collar 128 and manifold 110. Accordingly, the releasable coupling of the collar 128 (and nozzle 130) to the melt-transfer bushing 116 is with effect that a predetermined first pre-load is applied at the interface between the flanged end 131 of the nozzle and the melt-transfer bushing 116 as the collar 128 is hand-torqued, relative to the melt-transfer bushing. The first and second preloads are set and controlled at ambient temperature to ensure effective sealing at the interface of the nozzle 130 and the melt-transfer bushing 116 while also preventing excessive forces being applied at the interface between the flanged end 131 of the nozzle 130 and the melt-transfer bushing 116 that would prevent or otherwise interfere with the lateral thermal expansion and shifting that is required to bring the axis X-X of the outlet opening of the melt-transfer bushing 116 into alignment with the axis Y-Y of the inlet opening of the nozzle 130. Therefore, rather than relying on axial thermal expansion of components as the system 100 is brought to operating temperature to effectively close cold gaps to establish effective sealing between the nozzle and the manifold, the present system relies on mechanical preloads to create effective sealed interfaces between components within the system 100 without the need to bring the system to operating temperature.

Furthermore, the collar 128 is configured such that further torquing of the collar 128 relative to the melt-transfer bushing 116, after the flanged end 131 of the nozzle 130 has already contacted the melt-transfer bushing 116, is with effect that the inwardly extending flange 132 begins to distort against the flanged end 131 of the nozzle 130 which, in turn, causes the outwardly extending flange 134 of the collar 128 to deflect away from the manifold 110 thereby preventing excessive forces being applied to the flanged end 131 of the nozzle 130 by the collar 128. Thus, in some embodiments, for example, the configuration of the collar 128 with the outwardly extending flange 134 projecting along the manifold 110 and the inwardly extending flange 132 projecting along and engaging the flanged end 131 of the nozzle 130, in effect, acts as a high-tension spring holding constant tension on the nozzle 130 and against the manifold 110.

Accordingly, in the present system 100, rather than relying solely on axial thermal expansion to achieve sealing at critical interfaces within the system (which can be difficult to control), the combination of the one or more cold gaps 153, 155 that are designed into the system 100 at ambient temperature and the mechanical first and second preloads that are achieved upon assembly of the system 100, the sealing effect that is achieved at critical interfaces is achieved, in part, due to the cooperating, highly-toleranced surfaces of the collar 128, which surfaces can be specifically dimensioned and controlled via manufacturing techniques to achieve the adequate amount of mechanical preload at the required interfaces while the system 100 is in a cold condition to ensure that effective sealed interfaces are established within the system 100 even in the event that the system 100 does not fully reach operating temperature. Accordingly, it will be understood that the releasable securing of the collar 128 to the melt-transfer bushing 116 at ambient or assembly temperature is effective to pinch the outwardly extending flange 134 of the collar 128 against the manifold 110 and to pinch of the nozzle between the melt-transfer bushing 116 and the inwardly extending flange 132 of the collar 128. The pinching is sufficient for effecting a sealed interface between the outwardly extending flange 134 and the manifold 110. Therefore, in the event of leakage of molten material between the melt-transfer bushing 116 and the inner surface of bore 125, leakage of molten material past the sealed interface or pinch point that is effected between the outwardly extending flange 134 and the manifold 110 is resisted thereby protecting the mold assembly from leakage of molten material.

In addition to the sealed interface or pinch point 160 that is effected between the outwardly extending flange 134 of collar 128 against the manifold 110, as the collar 128 is releasably secured to the melt-transfer bushing 116, a further sealed interface or pinch point 162 is effected between the outwardly extending flange 124 of the melt-transfer bushing 116 and the rear surface 109 of the manifold 110. This sealed interface or pinch point 162 is effected in response to the releasable securing of the collar 128 to the melt-transfer bushing 116 which causes a downwards force to be applied to by the outwardly extending flange 124 of the melt-transfer bushing 116 against the manifold 110 while an upwards force is exerted by the outwardly extending flange 134 of the collar 128 against the manifold 110, thereby effectively sandwiching or pinching the manifold 110 between the outwardly extending flange 124 of the melt transfer bushing 116 and the outwardly extending flange 134 of the collar 128. The pinch point or sealed interface 162 effected between the outwardly extending flange 124 of the melt transfer bushing 116 and the rear surface 109 of the manifold 110 is further reinforced by the pressure applied by the back plate 115 against the first or flanged end 121 of the melt-transfer bushing 116. The pressure of the back plate 115 acting against the outwardly extending flange 124 of the melt-transfer bushing 116 and the securing of the back plate 115 to the manifold plate 114 with fasteners within the overall assembly applies additional pressure against the flanged end 124 of the melt transfer bushing 116 to create an effective sealed interface between the outwardly extending flange 124 and the manifold 110 at pinch point 162. Therefore, in the event of leakage of molten material at the interface between the manifold 110 and the body 118 of the melt-transfer bushing 116, the sealed interface or pinch point 162 that is established between the flanged end 124 of the melt transfer bushing 116 and the manifold 110 is effective to mitigate risk of damage associated with leakage of molten material Accordingly, it will be understood that by mounting the nozzle 130 to the manifold 110 via the releasable connection between the collar 128 and the melt-transfer bushing 116 is effective to establish at least two sealed interfaces (or pinch points) 160, 162 with the manifold 110 thereby reducing the likelihood of leakage of molten material within the overall mold assembly.

Figure 7:
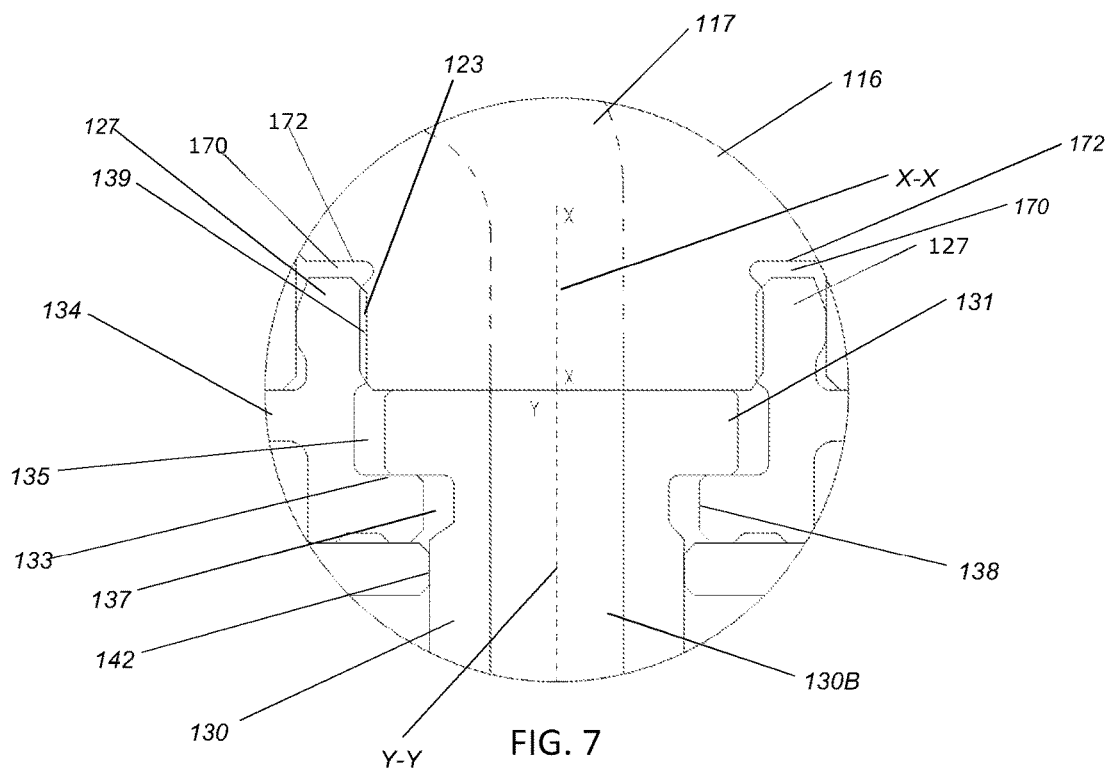
FIG. 7 is a detail view illustrating the alignment of the nozzle with the manifold of the injection molding nozzle system of FIG. 5 while the injection molding nozzle system is at operational temperature.

It should be noted that the melt-transfer bushing 116 and the collar 128 are each configured such that, while the collar 128 is releasably coupled to the melt-transfer bushing 116, a gap 170 remains between the uppermost end of the first end 127 of the collar 128 and the outwardly extending shoulder surface 172 defined by the main body 118 of the melt-transfer bushing 116, as illustrated in the detail views of FIGS. 5 and 7. Therefore, it will be understood that the abutting contact between the outwardly extending flange 134 of collar 128 and the manifold 110, and not the first end 127 of the collar 128 abutting the shoulder surface 172 defined by the body 118 of the melt-transfer bushing 116, limits how far the melt-transfer busing 116 can be threaded onto the outlet end 122 of the melt-transfer bushing 116.

The mechanical preloads of the system 100 described herein allow for cold start-ups while minimizing the potential for leakage of molten material into the mold assembly given that sealed interfaces are already established at key interfaces within the system 100 at cold-start conditions or at temperatures that are less than the predetermined, optimal operating temperature via the mechanical assembly of the releasable coupling of the collar 128, together with nozzle 130, to the melt-transfer bushing 116 disposed within the manifold 110. Conventional systems often rely on the axial thermal expansion of components to establish effective seals to avoid leakage of molten material. However, if the injection process is started prior to the system reaching the predetermined optimal operational temperature, the system is likely to leak as the cold gaps are not fully closed. Leakage of molten material within the mold assembly can be costly not only due to the requirement of replacing damaged components, but is also costly as production must be halted in order to effect repairs. Additionally, in systems that rely on the system reaching a predetermined operational temperature to establish effective sealed interfaces, if there is a problem with one of the mold cavities of a multi-cavity mold assembly, it is common practice to shut off delivery of molten material to the affected nozzle and to also shut off the corresponding nozzle heater 174, resulting a cold nozzle and non-uniform temperature across the system 100 and within the overall assembly. The non-uniform temperature distribution within the system 100 brought on by the cold nozzle will result in different preloads being applied to nozzles 130 in the region of the cold nozzle (since the cold nozzle and the surrounding area will not reach the predetermined operating temperature) as compared to the other nozzles within the assembly. This scenario can increase the likelihood of leakage in the area of the cold nozzle in systems that rely on thermal expansion to establish effective seals between components. Similarly, if a nozzle heater 174 burns out or malfunctions within the system 100 without the mold operator noticing, there is a danger of leaks of molten material in the area of the burned-out nozzle. However, in the system of FIGS. 4-11, the mechanically set and held preloads reduce and/or prevent the likelihood of leakage of molten material within the assembly even if a nozzle changes temperature and/or does not reach operating temperature for any particular reason.

As set out above, a conventional nozzle/manifold assembly can have a thermal axial expansion as high as 0.017 inches when heated to operating temperature. The thermal expansion can result in high compressive loads being applied on the steels of the manifold and mold plates which can result in wear or damage to the manifold between nozzles and pressure pads, sometimes resulting in indentations within the manifold. This type of wear can increase the likelihood of leakage in these areas, over time. In the system 100 of the present disclosure, wherein only very small cold gaps 153, 155 of on the order of 0.001 inches to 0.004 inches at the interface between the collar 128 and the support ring 140 and/or between the support ring 140 and the shoulder surface defined by the nozzle-receiving pocket 113, and very highly controlled preloads at the interface between the nozzle 130 and the outer end of the melt-transfer bushing 116 are built into the system 100 the cold gaps 153, 155 and the controlled preloads result in relatively smaller forces being applied to the components of the system 100 when the system 100 is fully heated to operating temperature. The overall system 100 and the components will, therefore, have a longer working life than typical or conventional systems.

Furthermore, the preloaded seal or pinch point 160 at the interface between the outwardly extending flange 134 of the collar 128 and the manifold 110 that is established as the collar 128 is releasably coupled to the melt-transfer bushing 116, via the threaded connection, is such that the collar 128 retains the nozzle 130 in place, relative to the melt-transfer bushing 116 and manifold 110, while still allowing the manifold to expand laterally so that that the axis X-X of the outlet opening 120 of the melt-transfer bushing 116 and the axis Y-Y of the nozzle 130 and pocket 112 become aligned once the system reaches operating temperature. The dimensions of the outlet end 122 of the melt-transfer bushing 116, the opening or bore 125 in the manifold 110, and the first end 127 of the collar 128 are such that, when there is lateral movement of the manifold 110, due to lateral thermal expansion of the manifold 110 as the system is brought to operating temperature, the lateral thermal expansion does not subject the threaded connection between the collar 128 and the outlet end 122 of the melt-transfer bushing 116 to extreme forces thereby protecting the threaded connection from lateral seizing of the threads, that could otherwise occur.

The system 100 of the present disclosure also provides for improved manufacturability requiring fewer overall components and fewer processing steps. In the subject application, the manifold 110 requires a simple through-bore for receiving the melt-transfer bushing 116. The machining of a simple through-bore for receiving and stationing the melt-transfer bushing 116 is a less complex manufacturing process as compared to the milling an annular receiving gap into the manifold for receiving a suitable collar/nozzle assembly, for example, as in some other known previous designs. The machining of the bore 125 for stationing the melt-transfer bushing 116 does not require any precision manufacturing unlike other known prior art systems. Additionally, the system 100 of the present disclosure requires threading of the outer surface of the outlet end 122 of the melt-transfer bushing 116 and threading of the inner surface of the first end 127 of the collar 128. As the melt-transfer bushing 116 and the collar 128 are relatively smaller components, as compared to the manifold 110, manipulating the melt transfer bushing 116 and the collar 128 for further processing is a less complex undertaking as compared to subjecting a larger component, such as the manifold, to further processing to establish the required threaded connections. In the subject application, the threaded connections for the melt-transfer bushing 116 and for the collar 128 are established via a thread-turning manufacturing process, which is a fairly inexpensive manufacturing process as compared to, for example, thread-milling which is required for threading the outer diameter of an annular gap, as is required in other known prior art systems. Thread-turning uses a single point tool and is an extremely effective and easily implemented process.

As described above, the system 100 of the present disclosure also provides for two, individual pinch points 160, 162 within the system 100, which pinch points 160, 162 serve to reduce the likelihood of leakage of molten material from within the system 100. The first or flanged end 121 of the melt-transfer bushing 116 creates a pinch point 162 at the interface of the outwardly extending flange 124 of the melt-transfer bushing 116 against the manifold 110 as the collar 128 is releasably secured to the melt transfer bushing 116 which is further reinforced as the flanged end of the melt-transfer bushing 116 is backed by back plate 115. The pressure of the back plate 115 acting against the outwardly extending flange 124 of the melt-transfer bushing 116 as the back plate 115 is secured to the manifold plate 114 applies sufficient pressure against the flanged end of the melt transfer bushing 116 to create an effective sealed interface between the outwardly extending flange 124 and the manifold 110. Therefore, in the event of leakage of molten material at the interface between the manifold 110 and the body 118 of the melt-transfer bushing 116, the pinch point 160 between the flanged end of the melt transfer bushing 116 and the manifold 110 creates an effective sealed interface to mitigate risk of damage associated with leakage of molten material. A further pinch point 162 is effected at the interface between the manifold 110 and the outwardly extending flange 134 of the collar 128 as the collar 28 is releasably secured to the melt-transfer bushing 116. Therefore, in the event of leakage of molten material at the interface between the manifold 110 and the body 118 of the melt-transfer bushing 116, or at the interface between the nozzle 130 and the end surface of the outlet end 122 of the melt-transfer bushing 116, the second pinch point 162 between the outwardly extending flange 134 of the collar 128 and the manifold 110 creates an effective sealed interface to mitigate risk of damage associated with leakage of molten material. The establishment of sealed interfaces or pinch points with the manifold 110 upon the releasable connection of the nozzle 130 to the manifold 110 via the releasable connection between the collar 128 and the melt-transfer bushing 116 coupled with the ability to control mechanical preloads and pressurized loads within the system 100, while still allowing for lateral thermal expansion of the components, provides for an injection molding nozzle system with an improved dynamic seal that also provides manufacturing advantages.

While various embodiments of the injection molding system have been described, it will be understood that certain adaptations and modifications of the described embodiments can be made. Therefore, the above discussed embodiments are considered to be illustrative and not restrictive.

What is claimed is:

1. An injection molding nozzle system comprising:
a manifold;
a melt-transfer bushing disposed within the manifold, the melt-transfer bushing defining a melt-transfer passage having an inlet end configured for receiving molten material from the manifold along a melt-receiving axis and an outlet end configured for discharging molten material along a melt discharge axis, the outlet end defining a melt discharge opening that defines an outlet center along the melt discharge axis when viewed in an axial direction;
a nozzle having an inlet end for receiving molten material from the melt-transfer bushing and a discharge end for discharging the received molten material, a molten material passage extending along a nozzle passage axis and interconnecting the inlet end and the discharge end, the inlet end of the nozzle defining a nozzle center along the nozzle passage axis when viewed in the axial direction; and
a collar configured for receiving the nozzle and for releasably coupling to the melt-transfer bushing;
wherein:
the melt-transfer bushing has an outwardly extending flange configured for engaging the manifold;
the collar has an outwardly extending flange configured for engaging the manifold, a central opening through which the nozzle extends, and an inwardly extending flange configured for engaging the inlet end of the nozzle;
and
the releasable coupling of the collar to the melt-transfer bushing is with effect that:
the inlet end of the nozzle is disposed in abutting contact with the outlet end of the melt-transfer bushing such that the inlet end of the nozzle is disposed in fluid communication with the melt-transfer passage;

the outwardly extending flange of the melt-transfer bushing applies a first sealing force against a first side of the manifold in a first direction such that a first sealed interface is effected between the melt-transfer bushing and the first side of the manifold;

the outwardly extending flange of the collar applies a second sealing force against a second, opposite side of the manifold in a second direction such that a second sealed interface is effected between the collar and the second side of the manifold, wherein the second direction is opposite to the first direction; and relative movement between the nozzle and the melt-transfer bushing in response to thermal expansion of the manifold is permitted.

2. The injection molding nozzle system as claimed in claim 1;
wherein:
the releasable coupling between the collar and the melt-transfer bushing is effected by a threaded connection between an inner surface of the collar that defines a portion of the central opening and an outer surface of the outlet end of the melt-transfer bushing.

3. The injection molding nozzle system as claimed in claim 1;
further comprising:
a manifold plate defining a manifold-receiving pocket and a nozzle-receiving pocket; and
a nozzle support ring disposed within the nozzle-receiving pocket and configured for receiving the nozzle;
wherein:
the manifold, the melt-transfer bushing, the nozzle, the collar, the manifold plate and the nozzle support ring are cooperatively configured such that:
the manifold is disposed within the manifold-receiving pocket;
the nozzle extends through the nozzle support ring and into the nozzle-receiving pocket of the manifold plate;
the nozzle support ring supports the nozzle relative to the manifold plate such that:
relative movement between the nozzle and the manifold plate is resisted such that the nozzle remains stationary within the nozzle-receiving pocket.

4. The injection molding nozzle system as claimed in claim 3;
wherein:
while the system is in a non-operational state wherein the system is at a temperature that is less than a predetermined operating temperature:
the outlet center of the melt-transfer bushing and the inlet center of the molten material passage of the nozzle are offset relative to one another in a lateral direction that extends perpendicular to the melt discharge axis and to the nozzle passage axis; and
while the system is in an operational state:
the manifold and the nozzle each, independently, reach respective operating temperatures such that the manifold and the nozzle each, independently, undergo thermal expansion with effect that:
the manifold moves laterally relative to the manifold plate;
lateral movement of the nozzle relative to the manifold plate is resisted due to interference between the nozzle support ring and the manifold plate and interference between the nozzle and the nozzle-support ring; and
the lateral movement of the manifold relative to the manifold plate is with effect that the outlet center of the melt-transfer bushing is aligned with the inlet center of the molten material passage of the nozzle in the lateral direction such that there is an absence of the offset between the outlet center of the melt-transfer bushing and the inlet center of the molten material passage.

5. The injection nozzle system as claimed in claim 4;
wherein:
the releasable coupling of the collar to the melt-transfer bushing such that the nozzle is disposed in abutting contact with the outlet end of the melt-transfer bushing is with effect that:
while the system is in the non-operational state:
a first preload is defined between abutting surface of the nozzle and the collar; and
a second preload is defined between abutting surfaces of the nozzle and the outlet end of the melt-transfer bushing.

6. The injection nozzle system as claimed in claim 5;
wherein:
establishment of the first preload, the second preload, the first sealed interface and the second sealed interface upon the releasable coupling of the collar to the melt-transfer bushing is such that:
while the system is at a temperature that is less than the predetermined operating temperature and molten material is delivered to the nozzle from the manifold, via the melt transfer bushing:
there is an absence of leakage of the molten material at the interface defined by the first preload, the interface defined by the second preload, the first sealed interface and the second sealed interface.

7. The injection nozzle system as claimed in claim 6;
wherein:
the nozzle-receiving pocket has a first portion that defines an inwardly extending shoulder surface and a second portion that extends longitudinally away from the inwardly extending shoulder; and
disposition of the nozzle support ring within the nozzle-receiving pocket is such that:
while the system is in the non-operational state:
at least one cold gap is defined between at least one of: (i) face-to-face surfaces of the nozzle support ring and the inwardly extending shoulder surface, and (ii) face-to-face surfaces of the nozzle support ring and the inwardly extending flange of the collar; and
while the system is in the operational state:
the at least one cold gap is reduced to zero such that the face-to-face surfaces of the nozzle support ring and the inwardly extending shoulder surface and/or the face-to-face surfaces of the nozzle support ring and the inwardly extending flange of the collar are disposed in abutting contact with effect that a pressurized load is applied between the abutting surfaces of the nozzle support ring and the inwardly extending shoulder surface and/or the abutting surfaces of the nozzle support ring and the inwardly extending flange of the collar.

8. The injection nozzle system as claimed in claim 7;
wherein:
the at least one cold gap is dimensioned such that the system includes a total cold gap of between a minimum of 0.001 inches to a maximum of 0.008 inches.

9. The injection nozzle system as claimed in claim 6;
wherein:
the nozzle-receiving pocket has a first portion that defines an inwardly extending shoulder surface and a second portion that extends longitudinally away from the inwardly extending shoulder; and disposition of the nozzle support ring within the nozzle-receiving pocket is such that:
while the system is in the non-operational state:
a first cold gap is defined between the nozzle support ring and the inwardly extending shoulder surface; and
a second cold gap is defined between the nozzle support ring and the inwardly extending flange of the collar; and
while the system is in the operational state:
the first cold gap is reduced to zero such that the nozzle support ring is disposed in abutting contact with the inwardly extending shoulder surface of the first portion of the nozzle-receiving pocket; and
the second cold gap is reduced to zero such that the nozzle support ring is disposed in abutting contact with the inwardly extending flange of the collar.

10. The injection nozzle system of claim 9;
wherein:
the first cold gap is at least 0.001 inches to a maximum of 0.004 inches; and
the second cold gap is at least 0.001 inches to a maximum of 0.004 inches.

11. The injection nozzle system as claimed in claim 9;
wherein:
the reducing of the first cold gap and the second cold gap to zero is in response to axial thermal expansion of at least the manifold.

12. The injection nozzle system as claimed in claim 1;
wherein:
the manifold includes a melt-transfer bushing receiver for receiving the melt-transfer bushing, the melt-transfer bushing receiver extending through the manifold from the first side to the second side.

13. The injection nozzle system as claimed in claim 12;
wherein:
the melt-transfer bushing includes:
a body having an outer diameter, the body extending between a first end and a second end, the outwardly extending flange extending radially outwardly from the first end of the body;
the second end is disposed opposite to the first end, the second end defining the outlet end of the melt-transfer bushing;
the second end has an outer diameter that is less than the outer diameter of the body such that:
disposition of the melt-transfer bushing within the manifold is with effect that an annular gap is established between the outer diameter of the second end of the melt-transfer bushing and an inner surface of the melt-transfer bushing receiver; and
the annular gap is configured for receiving a first end of the collar.

14. The injection nozzle system as claimed in claim 13;
further comprising:
a melt-transfer bushing securing device having a first end configured for engaging the outwardly extending flange of the melt-transfer bushing and a second end configured for engaging the first side of the manifold for stationing the melt-transfer bushing relative to the manifold such that rotation of the melt-transfer bushing relative to the manifold about the melt discharge axis is prevented.

15. The injection nozzle system as claimed in claim 14;
wherein:
the melt-transfer bushing includes at least one groove disposed in an outer perimeter of the outwardly extending flange for engaging with the first end of the melt-transfer bushing securing device.

16. The injection nozzle system as claimed in claim 15;
wherein:
the melt-transfer bushing securing device includes at least one dowel;
a first end of the dowel is received within the at least one groove; and
a second end of the dowel is received within a corresponding opening defined in the manifold.

17. The injection nozzle system as claimed in claim 1;
further comprising:
a back plate;
wherein:
the manifold plate is configured for receiving the back plate such that the back plate encloses the manifold and the nozzle within the manifold-receiving pocket and the nozzle-receiving pocket of the manifold plate; and
disposition of the back plate on the manifold plate is with effect that the outwardly extending flange of the melt-transfer bushing is pinched between the manifold and the back plate.

18. The injection nozzle system as claimed in claim 13;
wherein:
the inlet end of the melt-transfer passage is defined within the outer surface of the body portion of the melt-transfer such that the inlet end of the melt-transfer passage is disposed intermediate the first sealed interface effected between the outwardly extending flange of the melt-transfer bushing and the second sealed interface effected between the collar and the second side of the manifold such that:
while the system is in an operational state:
leakage of molten material at the interface of the manifold and the inlet end of the melt-transfer passage beyond into the manifold plate is resisted by the first sealed interface and the second sealed interface.

19. The injection nozzle system as claimed in claim 1;
wherein:
the system is a single cavity system; and
the nozzle disposed for communication with a single mold cavity.

20. The injection nozzle system as claimed in claim 1;
wherein:
the system is a multiple cavity system;
the multiple cavity system comprising:
a plurality of nozzles, wherein each nozzle, independently, is releasably secured to the manifold via a corresponding melt-transfer bushing and corresponding collar.

* * * * *